United States Patent Office 3,264,281
Patented August 2, 1966

3,264,281
PREPARATION OF AMIDES
Thomas H. Applewhite, Concord, and Jane S. Nelson, Berkeley, Calif., assignors to the United States of America as represented by the Secretary of Agriculture
No Drawing. Filed Apr. 23, 1963, Ser. No. 275,170
11 Claims. (Cl. 260—112.5)

A non-exclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of novel methods for preparing amides. Further objects of the invention will be evident from the following description wherein parts and percentages are by weight unless otherwise specified.

A well known method for preparing amides, generally referred to as the "mixed anhydride" methods, typically involves the following operations: The carboxylic acid which is to be formed into an amide is contacted with a tertiary amine, such as triethylamine, to prepare the carboxylic acid-tertiary amine salt. This salt, in solution in a solvent such as tetrahydrofuran, is placed in a vessel and while stirring and cooling it, an alkyl chloroformate, typically ethyl chloroformate, dissolved in an inert solvent is added dropwise to the salt solution. This reaction yields a mixed anhydride, that is, a carboxylic-carbonic anhydride. The selected amidifying agent (ammonia or a primary or secondary amine) is then added to the system whereby the corresponding amide of the carboxylic acid is formed. The procedure is illustrated by the following formulas:

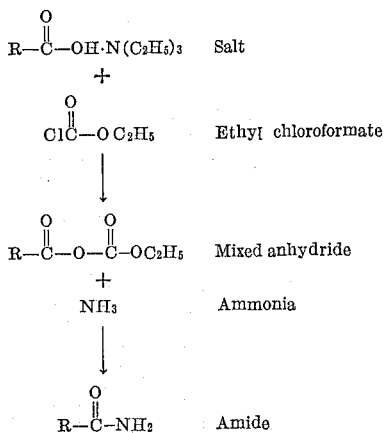

[In the above formulas and those provided below, R stands for the non-carboxyl portion of the organic acid involved. For example, if the process concerns oleic acid, R is the radical $CH_3—(CH_2)_7—CH=CH—(CH_2)_7—$.]
In this known process it is the invariable practice that the chloroformate is added slowly to the full quantity of the carboxylic acid-tertiary amine salt. This technique—herein termed "direct addition" for convenience in future references—has the effect that during the major part of the reaction leading to the formation of the mixed anhydride, there is an excess of carboxylic acid-tertiary amine salt in the reaction mixture. Such a situation, we have found, is actually disadvantageous as it leads to formation of undesired by-products and, in the case of optically-active compounds, causes racemization.

In operating in accordance with the invention, the reaction of the salt and the chloroformate is conducted under conditions such that the chloroformate is in excess during the major part of the reaction period. Typically, the process of the invention is carried out by providing a quantity of chloroformate and slowly adding the carboxylic acid salt thereto whereby each increment of salt reacts as it enters the system forming the mixed anhydride and thereby a residuum of unreacted chloroformate remains in excess for the most part of the reaction period. The technique of the invention, termed "inverse addition" for convenience in referring thereto, provides these major advantages:

(1) Increased yield of the desired end product—the amide.
(2) Greater efficiency of isolation of the end product because of lesser contamination with by-products.
(3) In the case of optically-active compounds, racemization is suppressed with the result that the optical activity of the starting materials, for example, that of an optically-active α-amino acid, will be retained essentially intact.

The basis of the novel results attained by the process of the invention is believed to involve the following mechanism: In the known direct addition system the excess of the salt in the reaction system leads to the formation of symmetrical anhydrides as by-products through reaction of the salt with the mixed anhydride present in the reaction system. This mechanism is illustrated by the following formulas:

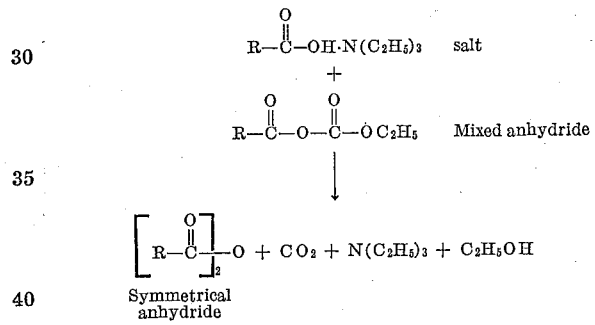

Such a reaction competes with the desired one, causing a diminution in yield of the end product which is being sought. On the other hand, in the process of the invention, since there is essentially no unreacted salt in the system, the formation of symmetrical anhydride cannot occur. With regard to the racemization which occurs in the known process, this is ascribed to the excess of carboxylic acid-tertiary amine salt in the system. Thus, it is believed that this salt acts as a racemization catalyst so that optical activity is destroyed and the products are racemic mixtures, i.e., mixtures of the levo and dextro forms, which have no optical activity. In the process of the invention there is no excess of the salt and as a consequence racemization is eliminated or at least greatly suppressed. Although the above mechanisms are believed to be the basis for the success of the present invention, the scope of the invention is not to be limited to any particular theoretical consideration.

The invention is of wide versatility and can be employed to prepare amides from carboxylic acids of any type. Thus, for example, the carboxylic acids may be saturated or unsaturated, aromatic, aliphatic, or even heterocyclic. The carboxylic acids may be unsubstituted or may contain non-interfering substituents such as ether groups, amide groups, ketone groups, ester groups, sulphone groups, fluoride groups, etc. Typical examples of carboxylic acids to which the invention may be applied are benzoic acid, o-, m-, or p-toluic acid, phenylacetic acid, cinnamic acid, N-acetylaminobenzoic acid, anisic acid, diphenyl acetic acid, o-, m-, or p-benzoylbenzoic acid, o-, m-, or p-benzylbenzoic acid, benzoylacetic acid, phenoxyacetic acid, phenoxybenzoic acid, difluorobenzoic acid, hexahydrobenzoic acid, acetic acid, butyric acid, caproic acid, capyrlic acid, capric acid, lauric acid, myristic acid, palmitic acid, stearic acid, behenic acid, oleic acid, linoleic acid, acetylmalic acid, N-acetyl adipamic acid, difluoroacetic acid, methoxyacetic acid, etc.

Although the process of the invention is of general applicability, it is of particular value with long-chain hydroxy fatty acids since the preparation of amides from such acids by conventional techniques is generally not satisfactory due to steric effects and/or interference from the hydroxyl groups. It is to be noted that in the process of the invention the hydroxy groups on the chain of the fatty acid do not interfere in the reaction. Typical illustrative examples of hydroxy fatty acids which come within the ambit of the invention are: mono-, di-, and tri-hydroxy caprylic acids; mono-, di-, and tri-hydroxy capric acids; mono-, di-, and tri-hydroxy lauric acids; mono-, di-, and tri-hydroxy myristic acids; mono-, di-, and tri-hydroxy palmitic acids; mono-, di-, and tri-hydroxy stearic acids; mono-, di-, and tri-hydroxy behenic acids; etc. Coming into special consideration are the $C_{18}$ hydroxy fatty acids, saturated or unsaturated, typically the mono- or polyhydroxy substituted stearic, oleic, or linoleic acids. Among such acids may be enumerated the following for the purpose of illustration: 6-hydroxyoctadecanoic acid, 7-hydroxyoctadecanoic acid, 12-hydroxyoctadecanoic acid, 9,10-dihydroxyoctadecanoic acid, 11,12-dihydroxyoctadecanoic acid, 9,10,12-trihydroxyoctadecanoic acid, 12-hydroxy-cis-9-octadecenoic acid (i.e., ricinoleic acid), 12-hydroxy-trans-9-octadecenoic acid (i.e., ricinelaidic acid), and the like. Also of interest are keto acids such as 9,12-dioxo-10-hydroxyoctadecanoic acid, 9,12-dioxo-10-octadecenoic acid, etc.

The process of the invention is applicable to the preparation of peptides and in preparing such compounds the carboxylic acid may be any amino acid, for example, any of the natural α-amino acids such as glycine, alanine, valine, leucine, norleucine, isoleucine, phenylalanine, tyrosine, threonine, serine, proline, hydroxyproline, tryptophane, thyroxine, iodogorgoic acid, methionine, cystine, cysteine, lysine, arginine, histidine, aspartic acid, glutamic acid, or β-hydroxyglutamic acid. Also included in this category are the α-amino acids containing peptide linkages. Typical example of such compounds are glycyl-glycine, glycyl-alanine, glycyl-valine, glycyl-leucine, glycyl-isoleucine, glycyl-norleucine, glycyl-lysine, glycyl-serine, glycyl-threonine, glycyl-phenylalanine, glycyl-tyrosine, glycyl-aspartic acid, glycyl-cystine, glycyl-methionine, glycyl-arginine, glycyl-tryptophane, glycyl-histidine, glycyl-proline, glycyl-hydroxyproline, glycyl-iodogorgoic acid, glycyl-thyroxine, alanyl-glycine, alanyl-alanine, alanyl-valine, alanyl-leucine, alanyl-isoleucine, alanyl-norleucine, alanyl-lysine, alanyl-serine, alanyl-threonine, alanyl-phenylalanine, alanyl-tyrosine, alanyl-aspartic acid, alanyl-cystine, alanyl-methionine, alanyl-arginine, alanyl-tryptophane, alanyl-histidine, alanyl-proline, alanyl-hydroxyproline, alanyl-iodogorgoic acid, alanyl-thyroxine, glycyl-glycyl-glycine, glycyl-glycyl-alanine, glycyl-glycyl-valine, glycyl-glycyl-leucine, glycyl-glycyl-isoleucine, glycyl-glycyl-norleucine, glycyl-gycyl-lysine, glycyl-glycyl-serine, glycyl-glycyl-threonine, glycyl-glycyl-phenylalanine, glycyl-glycyl-tyrosine, glycyl-glycyl-aspartic acid, glycyl-glycyl-cystine, glycyl-glycyl-methionine, glycyl-glycyl-arginine, glycyl-glycyl-tryptophane, glycyl-glycyl-histidine, glycyl-glycyl-proline, glycyl-glycyl-hydroxyproline, glycyl-glycyl-iodogorgoic acid, glycyl-glycyl-thyroxine, glycyl-glycyl-glycyl-glycine, and so forth. In applying the process of the invention to such compounds the amino function of the amino acid (or the amino acid containing peptide groups) is first blocked, in conventional manner, by amidifying it. Thus typically, the compound is first converted into an N-acyl derivative such as an N-acetyl, N-phthaloyl, N-formyl, N-carboethoxy, or N-carbobenzoxy derivative.

In applying the process of the invention, the selected carboxylic acid is first formed into a salt with a tertiary amine. This merely requires, as well known in the art, commingling the acid and tertiary amine. Triethylamine is generally preferred for the latter reactant. However, the nature of the tertiary amine has no critical effect and one may use any tertiary amine which is free from reactive sites other than the tri-substituted nitrogen grouping. Typical alternative reactants are triisopropyl amine, tri-n-butyl amine, pyridine, N-methylpiperidine, N-ethylpiperidine, and the like. The salt is conveniently applied in the synthesis in the form of a solution in an inert volatile solvent such as toluene, xylene, tetrahydrofuran, methylene chloride, or the like. As explained hereinabove, it is a critical item in the process of the invention that the salt be added to the chloroformate in such manner that the chloroformate remains in excess during the major portion of the reaction period leading to the formation of the desired carboxylic-carbonic anhydride. In typical practice of the invention, the full amount of chloroformate (preferably dissolved in an inert solvent such as those referred to above) is placed in a reaction vessel and the salt solution is added thereto in increments. The rate at which the salt solution is added can be varied depending on such circumstances as the temperature of reaction and the reactivity of the selected salt and chloroformate. For example, if the particular salt and chloroformate react rapidly, then the addition of the salt solution can be relatively rapid without any danger that unreacted salt will exist in the system for any appreciable time. If, on the other hand, the compounds react slowly, then the rate of addition of the salt solution is decreased to avoid any substantial existence of unreacted salt in the reaction mixture. In any particular case, the optimum rate of addition of the salt solution can be determined by conducting pilot runs at different addition rates and noting which rates provide the desired goal of avoiding any substantial existence of unreacted salt in the system. If minimum time for conducting the operation is a factor for consideration, one would then select for the main run the fastest addition rate which provides the desired effect, that is, that there be no unreacted salt in the system, or, expressed in other words, that the chloroformate remain in excess during the major part of the reaction period. To sum up the situation, then, the critical point of the invention is that the carboxylic acid-tertiary amine salt is added in increments to the chloroformate and, for best results, the rate at which the salt is added is such that each increment has an opportunity to react with the chloroformate to produce a carboxylic-carbonic anhydride before the next successive increment contacts the chloroformate.

Generally, the reaction to form the carboxylic-carbonic anhydride is conducted at a temperature of about 0° C. to minimize decomposition of the said mixed anhydride. However, the temperature may be varied and, in general, the process may be conduucted at temperatures as low as −20° C. or as high as 40° C. Usually ethyl chloroformate is used as the chloroformate reactant in the system; however, other lower alkyl derivatives such as propyl, isopropyl, or butyl chloroformates are suitable. The reaction to produce the mixed anhydride involves equimolar proportions of chloroformate and neutralized carboxylic group, as obvious from the preceding equations. In many cases such equimolar proportions are used with the attainment of excellent results. However, it is often preferred to use an excess of chloroformate over the stoichiometric amount. This gives the the benefit that the existence of excess chloroformate during the formation of the mixed anhydride is assured, or, state in other words, the excess of chloroformate initially provided ensures driving the reaction in the direction of the desired mixed anhydride and minimizes existence of unreacted salt in the reaction system. We have found that the use of an excess of chloroformate over the stoichiometric amount is especially desirable in preparing optically-active products—for example, peptides— as particularly avoiding racemization.

After the solution of carboxylic acid-tertiary amine salt has been added in increments to the chloroformate solution, the reaction mixture containing the mixed anhydride is ready for production of the end product—the amide. This phase of the process is purely conventional and involves the addition of the selected amidifying agent whereby the mixed anhydride rapidly reacts with the added amidifying agent to form an amide, as well known in the art. Usually an excess of amidifying agent is supplied to drive the reaction in the required direction. The temperature of reaction is not critical and generally the process is conducted at ordinary (room) temperature for convenience. After the amide has been formed it is isolated from the reaction system by conventional techniques. One method, for example, involves evaporating the solvent under vacuum, then taking up the residue in a minimum amount of inert solvent. The resulting solution is washed successively with dilute acid, dilute alkali, and water. The solution is dried and then evaporated to remove the solvent, providing the product as a residue. Conventional crystallizing techniques may be applied to the product if especially pure products are desired.

The amidifying agent referred to in the previous paragraph will vary depending on what type of amide is desired. For example, if an unsubstituted amide is desired one would use ammonia; if a substituted amide is desired one would use a primary or secondary amine. Thus, typical amidfying agents are ammonia, mono- or di-methylamine, mono- or di-ethylamine, mono- or di-propylamine, mono- or di-butylamine, mono- or di-hexadecylamine, mono- or di-cyclohexylamine, aniline, diphenylamine, N-methylaniline, morpholine, piperidine, mono- or di-ethanolamine, mono- or di-isopropanolamine, mono- or di-benzylamine, p-aminobenzophenone, p-aminoacetophenone, ethylene diamine, phenylene diamine, hexamethylene diamine, etc. In preparing peptides, the amidifying reagents may be glycine, alanine, phenylalanine, or any other of the natural α-amino acids listed above. Preferably, the carboxylic function of the amino acid is blocked beforehand by esterification or amidification. For example, instead of using glycine, as such, it is preferred to use ethyl glycinate.

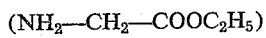

Further illustrations of this principle are well known and need not be expounded here. It is to be emphasized that the reaction of the mixed anhydride with the amidifying agent is well known in the art and no invention is claimed in this step, per se.

The process of the invention provides an efficient scheme for the preparation of amides of all kinds. These compounds are useful for a variety of purposes, as well known in the art. For example, the amides of long-chain fatty acids are useful as plasticizers for vinyl chloride-vinyl acetate copolymers and for cellulose acetate. The long-chain fatty acid amides are also useful as intermediates for the production of emulsifiers, wetting agents and detergents. The process of the invention also supplies a convenient route for the preparation of peptides. Such compounds are used by biochemists in investigating the mechanisms of life processes, for example, the mechanism by which proteins are synthesized in animals and plants.

The invention is further demonstrated by the following illustrative examples. The abbreviation "THF" used in the examples designates the solvent tetrahydrofuran.

EXAMPLE I

*N-t-butyl-12-hydroxy-cis-9-octadecenamide*

(A) *Inverse addition* (*in accordance with the invention*).—Ethyl chloroformate (1.05 ml., 0.011 mole) was dissolved in 50 ml. of THF.

12-hydroxy-cis-9-octadecenoic acid (3.3 g., 0.011 mole) and triethylamine (1.53 ml., 0.011 mole) were dissolved in 50 ml. of THF.

The solution of ethyl chloroformate was placed in a reaction vessel and while stirring it and keeping it at 0° C., the solution of the carboxylic acid-triethylamine salt was added slowly over a period of about 15 minutes. The reaction mixture was stirred for several minutes after completing the addition of the salt solution, then t-butylamine (0.011 mole) was added and the mixture allowed to stand overnight at room temperature. The solvent and excess t-butylamine were removed by evaporation under vacuum and the residue taken up in ether. The ether solution was washed successively with dilute HCl, 1 M $Na_2CO_3$, and water, then dried over $MgSO_4$ and the solvent evaporated. The product, N-t-butyl-12-hydroxy-cis-9-octadecenamide, was obtained in a yield of 98.5%.

(B) *Direction addition* (*known system*).—The procedure as described in part A was repeated with the exception that the solution of the carboxylic acid-triethylamine salt was placed in the reaction vessel and the solution of ethyl chloroformate added thereto slowly over a period of 15 minutes while keeping the reaction mixture at 0° C. In this case the yield of the amide was 88%.

EXAMPLE II

*N-t-butyl-12-hydroxyoctadecanamide*

(A) *Inverse addition* (*in accordance with the invention*).—Ethyl chloroformate (1.05 ml., 0.011 mole) was dissolved in 50 ml. of THF.

12-hydroxyoctadecanoic acid (0.011 mole) and triethylamine (1.53 ml., 0.011 mole) were dissolved in 50 ml. of THF.

The solution of ethyl chloroformate was placed in a reaction vessel and while stirring it and keeping it at about 0° C., the solution of the carboxylic acid-triethylamine salt was added slowly over a period of about 15 minutes. The reaction mixture was stirred for several minutes after completing the addition of the salt solution, then t-butylamine (0.11 mole) was added and the mixture was allowed to stand overnight at room temperature. The solvent and excess t-butylamine were removed by evaporation under vacuum and the residue taken up in ether. The ether solution was washed successively with dilute HCl, 1 M $Na_2CO_3$, and water, then dried over $MgSO_4$ and the ether evaporated. The product, N-t-butyl-12-hydroxyoctadecanamide, was obtained in a yield of 89%, M.P. 107–109° C.

(B) *Direct addition* (*known system*).—The procedure as described above in part A was repeated with the exception that the solution of the carboxylic acid-triethylamine salt was placed in the reaction vessel and the solution of ethyl chloroformate was added thereto slowly over a period of about 15 minutes while keeping the reaction mixture at 0° C. In this case the yield of the amide was 77%, M.P. 107–109° C.

EXAMPLE III

*N,N-diethyl-12-hydroxyoctadecanamide*

(A) *Inverse addition* (*in accordance with the invention*).—Ethyl chloroformate (0.011 mole) was dissolved in 50 ml. of THF.

Triethylamine (0.011 mole) and 12-hydroxydecanoic acid (0.011 mole) were dissolved in 50 ml. of THF.

The solution of ethyl chloroformate was placed in a reaction vessel and while stirring it and keeping it at about 0° C., the solution of the carboxylic acid-triethylamine salt was added over a period of about 15 minutes. The reaction mixture was stirred for several minutes after completing the addition of the salt solution, then diethylamine (0.011 mole) was added and the mixture was allowed to stand overnight at room temperature. The solvent was removed by evaporation under vacuum and the residue taken up in ether. The ether solution was washed successively with dilute HCl, 1 M Na₂CO₃, and water, then dried over MgSO₄, and the ether evaporated. The product, N,N-diethyl-12-hydroxyoctadecanamide, was obtained in a yield of 87%.

(B) *Direct addition (known system)*.—The procedure as described above in part A was repeated with the exception that the solution of the carboxylic acid-triethylamine salt was placed in the reaction vessel and the solution of ethyl chloroformate was added thereto over a period of about 15 minutes while keeping the reaction mixture at about 0° C. In this case the yield of amide was 58%.

EXAMPLE IV

*12-hydroxy-cis-9-octadecenamide*

(A) Ethyl chloroformate (1.05 ml., 0.011 mole) was dissolved in 50 ml. of THF and cooled to 0° C. with vigorous stirring. A solution of 12-hydroxy-cis-9-octadecenoic acid (3.3 g., 0.011 mole) and triethylamine (1.53 ml., 0.011 mole) in 50 ml. of THF was added to the chloroformate solution over a period of about 15 minutes while maintaining the reaction mixture at about 0° C. The system was stirred for several minutes after completing the addition of the carboxylic acid-triethylamine salt solution and then a stream of anhydrous ammonia gas was bubbled through the reaction mixture for 10 minutes. The reaction mixture was allowed to stand overnight, then the mixture was evaporated under vacuum to remove the solvent and the residue was taken up in ether. The ether solution was washed successively with dilute HCl, 1 M Na₂CO₃, and water, then dried over MgSO₄, and the solvent evaporated. The product, 12-hydroxy-cis-9-octadecenamide, was obtained in a yield of 89%, M.P. 64–65° C. The infrared spectrum of the product was identical with that of a pure sample of the amide.

(B) The procedure of part A, above, was repeated except that a 10% excess of ethyl chloroformate was used, i.e., 1.16 ml. instead of 1.05 ml. The yield of amide in this run was 92.5%.

(C) In another run the procedure of part A, above, was repeated in essence except that the direct addition system was used. Thus, the chloroformate solution was added at a slow rate to the solution of the carboxylic acid-triethylamine salt. In this case the yield of amide was 85%. Also, the product was not as pure as that of run A, as indicated by its lower melting range of 62–64° C.

EXAMPLE V

*N-carbobenzoxyglycinanilide*

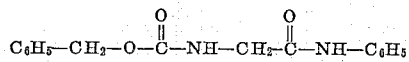

A solution of carbobenzoxyglycine (2.09 g., 0.01 mole) and triethylamine (1.4 ml., 0.01 ml.) in 25 ml. toluene was added over a 10-minute period to a solution of ethyl chloroformate (0.01 mole) in 25 ml. of toluene with vigorous stirring and while keeping the temperature at −5° to 0° C. Ten minutes after completion of the addition of the salt solution, freshly distilled aniline (0.91 ml., 0.01 mole) was added and the mixture allowed to stand at room temperature overnight. The white solid which had formed was filtered out, washed with 1 N hydrochloric acid, 1 M sodium carbonate solution, and water, and dried to yield 79.4% of the product, N-carbobenzoxyglycinanilide, M.P. 144–146° C. An additional 12% of crude product could be obtained by evaporation of the toluene solution and working up the residue as described in Example I, part A.

EXAMPLE VI

*Ethyl N-phthaloylglycylglycinate*

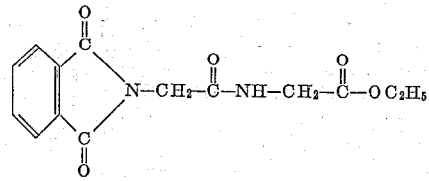

A solution of phthaloylglycine (2.05 g., 0.01 mole) and triethylamine (1.4 ml., 0.01 mole) in 25 ml. methylene chloride was added over a 20-minute period to a solution of ethyl chloroformate (1.9 ml., 0.02 mole) in 25 ml. methylene chloride with vigorous stirring and while maintaining the temperature at −6° C. Ten minutes after the addition was completed, 3.14 g. (0.02 mole) of solid ethyl glycinate hydrochloride was added, followed by dropwise addition of 3 ml. (0.021 mole) of triethylamine in 10 ml. of methylene chloride. The system was stirred until it came to room temperature and was held overnight. The solvent was removed by evaporation under vacuum and the residue was washed successively with water, 1 M sodium bicarbonate, and again with water. The product, ethyl N-phthaloylglycylglycinate, was thus obtained in a yield of 98%, M.P. 193.5–194.5° C.

In a control run wherein direct addition was used—that is, the ethyl chloroformate solution was slowly added to the phthaloylglycine-triethylamine salt solution—the yield was only 79.5%, M.P. 193–194° C.

EXAMPLE VII

*Ethyl N-formyl-L-phenylalanylglycinate*

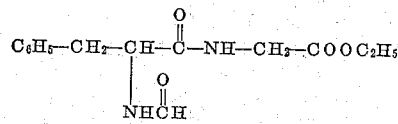

The starting material for the synthesis was the optically-active compound N-formyl-L-phenylalanine—

$[\alpha]_D^{25} + 69.5°$ (c. 4.2, ethanol)

A solution of 1.94 g. (0.01 mole) of the starting material and 1.4 ml. (0.01 mole) of triethylamine in 25 ml. of THF was added over a period of about 15 minutes to a solution of 0.95 ml. of ethyl chloroformate in 25 ml. of THF, which was stirred and kept at −6° C. Ethyl glycinate hydrochloride (1.4 g., 0.01 mole) and triethylamine (1.4 ml., 0.01 mole) in 30 ml. of methylene chloride was added after 30 minutes and the system was stirred 1.5 hours at room temperature. Filtration and evaporation of the filtrate gave a residue that was taken up in methylene chloride, washed with 1 N hydrochloric acid, 1 M sodium bicarbonate, and water, dried over MgSO₄, and evaporated in vacuo to yield 79.5% of a white solid. This was recrystallized from methylene chloride-carbon tetrachloride, giving the product, ethyl N-formyl-L-phenylalanylglycinate, in a yield of 39.7%, M.P. 127–127.5° C.—

$[\alpha]_D^{25} + 1.8°$ (c. 2.2, ethanol)

In another run, the ethyl chloroformate was used in two-fold excess. Also, ethyl glycinate, in three-fold excess, was used instead of the ethyl glycinate hydrochloride. In this case there was obtained 0.54 g. of the product in the form of fine white needles, M.P. 128–129° C.—

$[\alpha]_D^{25} + 2.6°$ (c. 2.2, ethanol)

An authentic sample of the same compound prepared by the known carbodiimide method, which is recognized to preserve optical activity, had a melting point 128–129° C., $[\alpha]_D^{25} + 2.7°$.

It is of interest to note that it has been reported (Sheehan and Yang, J. Am. Chem. Soc., 80, 1154) that when the conventional direct addition technique is applied to N-formyl-L-phenylalanine, complete racemization occurs. In other words, the product has the same composition as that produced by the inverse addition described herein but it is optically inactive.

EXAMPLE VIII

*Methyl N-carbobenzoxyglycyl-L-phenylalaninate*

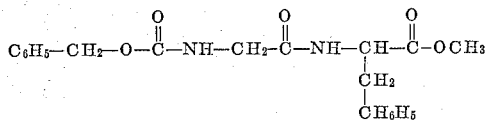

A solution of carbobenzoxyglycine (2.9 g., 0.01 mole) and triethylamine (1.4 ml., 0.01 mole) in 25 ml. of THF was added slowly to a solution of ethyl chloroformate (0.01 mole) in 25 ml. of THF, which was stirred and held at about 0° C. About 10 minutes after the addition had been completed there was added a slurry of L-phenylalanine methyl ester hydrochloride (2.26 g., 0.0105 mole) and 1.5 ml. of triethylamine in 50 ml. of THF. The mixture was held 3 hours at room temperature. Filtration and evaporation of the filtrate gave a residue that was taken up in methylene chloride, washed with 1 N hydrochloric acid, 1 M sodium bicarbonate, and water, direct over $MgSO_4$ and evaporated in vacuo to yield a crude product. On recrystallization from ethyl acetate-ligroin (B.P. 60–70° C.) the product, methyl N-carbobenzoxyglycyl-L-phenylalaninate, was obtained in 67.5% yield, M.P. 55–58° C., $[\alpha]_D^{25}+13.7$ (c. 2, ethanol).

EXAMPLE IX

*Ethyl N-carbobenzoxyglycyl-L-phenylalanylglycinate*

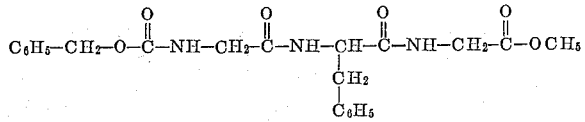

Carbobenzoxyglycyl-L-phenylalanine (0.713 g., 0.002 mole) and triethylamine (0.28 ml., 0.002 mole) in 10 ml. of THF were added over a 10-minute period to a well-stirred solution of ethyl chloroformate (0.004 mole) in 10 ml. THF at −5° C. Five minutes after completion of the addition, ethyl glycinate (0.619 g., 0.006 mole) in 10 ml. THF was added and the cold bath removed. Stirring was continued for about 1½ hours and the solvent removed in vacuo at 40° C. The residue was stirred up in 45 ml. of water and washed 10 x 5 ml. with water on the filter. After drying, 0.947 g. of solid, M.P. 110.5–114° C., was obtained. This material was taken up in ether, the ether solution being washed with water, then dried, and the ether evaporated. The residue was then treated in like manner but using ethyl acetate as the solvent. Finally, the purified material was crystallized from absolute ethanol, yielding 70% of white needles, M.P. 116–117.5° C., $[\alpha]_D^{25}$ −12.5° (c. 2, ethanol).

This compound has been obtained in the partially racemized form by both the conventional mixed anhydride method (Vaughan, J. Am. Chem. Soc., 74, p. 6137) and the carbodiimide method (Anderson et al., J. Am. Chem. Soc., 80, p. 2902).

Having thus described the invention, what is claimed is:

1. In the process of preparing a peptide wherein a salt of an optically-active N-acylated amino acid and a tertiary amine is reacted with a lower alkyl chloroformate to produce a carboxylic-carbonic anhydride and this anhydride is reacted with the amine function of an amino acid to produce a peptide, the improvement which comprises reacting said salt and said chloroformate while providing an excess of said chloroformate during the entire period of the reaction whereby to ensure formation of an optically-active peptide product.

2. In the process of preparing amides wherein a salt of a carboxylic acid and a tertiary amine is reacted with a lower alkyl chloroformate to produce a carboxylic-carbonic anhydride and this anhydride is reacted with a member of the group consisting of ammonia, a primary amine, and a secondary amine, to produce an amide of said carboxylic acid, the improvement which comprises adding said salt in increments to said chloroformate to maintain the chloroformate in excess during a major part of the reaction period whereby to suppress formation of a symmetrical anhydride of said carboxylic acid.

3. The process of claim 2 wherein the carboxylic acid is an aliphatic carboxylic acid.

4. The process of claim 2 wherein the carboxylic acid is a fatty acid containing more than 8 carbon atoms.

5. The process of claim 2 wherein the carboxylic acid is a hydroxy fatty acid containing more than 8 carbon atoms.

6. The process of claim 2 wherein the carboxylic acid is a hydroxy saturated fatty acid containing more than 8 carbon atoms.

7. The process of claim 2 wherein the carboxylic acid is a hydroxy unsaturated fatty acid containing more than 8 carbon atoms.

8. The process of claim 2 wherein the carboxylic acid is an N-acylated amino acid.

9. In the process of preparing amides wherein a salt of a carboxylic acid and a tertiary amine is reacted with a lower alkyl chloroformate to produce a carboxylic-carbonic anhydride and this anhydride is reacted with a member of the group consisting of ammonia, primary amines and secondary amines to produce an amide of said carboxylic acid, the improvement which comprises reacting said salt with said chloroformate by gradually adding a solution of said salt in an inert solvent to a solution of said chloroformate in an inert solvent whereby to ensure an excess of the chloroformate during a major part of the reaction period, thus to suppress formation of a symmetrical anhydride of said carboxylic acid.

10. In the process of preparing amides wherein a salt of a carboxylic acid and tertiary amine is reacted with a lower alkyl chloroformate to produce a carboxylic-carbonic anhydride and this anhydride is reacted with a member of the group consisting of ammonia, primary amines, and secondary amines to produce an amide of said carboxylic acid, the improvement which comprises conducting the reaction of the carboxylic acid-tertiary amine salt and the alkyl chloroformate in the following manner: providing a first solution of the alkyl chloroformate in an inert solvent, adding to said first solution a second solution containing the carboxylic acid-tertiary amine salt in an inert solvent, the second solution being added in successive increments at a rate such that each increment reacts with the chloroformate of the first solution to form a carboxylic-carbonic anhydride before the next successive increment of said second solution contacts the first solution.

11. In the process of preparing an amide wherein a salt of an optically-active N-acylated amino acid and a tertiary amine is reacted with a lower alkyl chloroformate to produce a carboxylic-carbonic anhydride and this anhydride is reacted with a member of the group consisting of ammonia, a primary amine, and a secondary amine, to produce an amide of said acid, the improvement which comprises reacting said salt with said chloroformate while providing an excess of said chloroformate during the entire period of the reaction whereby to ensure formation of an optically-active amide product.

No references cited.

CHARLES B. PARKER, *Primary Examiner.*

ANTON H. SUTTO, *Assistant Examiner.*